(12) United States Patent
Ruiz-Velasco et al.

(10) Patent No.: US 8,543,594 B2
(45) Date of Patent: *Sep. 24, 2013

(54) MANAGEMENT OF USER INTERFACE ELEMENTS

(75) Inventors: Enrique Ruiz-Velasco, Flower Mound, TX (US); Laxmi Patel, Irving, TX (US); Japan Mehta, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/194,388

(22) Filed: Jul. 29, 2011

(65) Prior Publication Data

US 2012/0011145 A1  Jan. 12, 2012

Related U.S. Application Data

(63) Continuation of application No. 11/760,460, filed on Jun. 8, 2007, now Pat. No. 8,010,531.

(51) Int. Cl.
*G06F 17/30* (2006.01)
(52) U.S. Cl.
USPC .......................................... 707/769; 715/719
(58) Field of Classification Search
None
See application file for complete search history.

(56) References Cited

U.S. PATENT DOCUMENTS

| 6,507,592 | B1 |  | 1/2003 | Hurvig et al. |
|---|---|---|---|---|
| 2002/0072989 | A1 | * | 6/2002 | Van De Sluis .................. 705/26 |
| 2006/0020474 | A1 | * | 1/2006 | Stewart et al. ................ 704/500 |
| 2006/0036571 | A1 | * | 2/2006 | Fukushima et al. .............. 707/1 |
| 2006/0161635 | A1 | * | 7/2006 | Lamkin et al. ................ 709/217 |
| 2006/0224846 | A1 | * | 10/2006 | Amarendran et al. ........ 711/162 |
| 2007/0180465 | A1 | * | 8/2007 | Ou et al. ......................... 725/34 |
| 2008/0116257 | A1 | * | 5/2008 | Fickling ........................ 235/379 |
| 2009/0106393 | A1 | * | 4/2009 | Parr et al. ..................... 709/218 |

* cited by examiner

*Primary Examiner* — Yuk Ting Choi (57) ABSTRACT

An exemplary system includes an element server in a video hub office configured to provide a media signal to a content processing device located at a customer premises and at least one computing device remote from the video hub office and the customer premises. The computing device comprises a first data store that includes a plurality of presentation elements, a second data store that includes information concerning associations of the presentation elements with a chunk that is a logical grouping of the presentation elements, and an element management subsystem that provides the presentation elements associated with the chunk to the element server in the video hub office, the element server configured to cache the presentation elements for use by the element server in fulfilling a request from the content processing device, wherein the computing device provides a user interface that presents information about the presentation elements associated with the chunk.

21 Claims, 6 Drawing Sheets

MANAGEMENT OF USER INTERFACE ELEMENTS

RELATED APPLICATIONS

This application is a continuation application of U.S. patent application Ser. No. 11/760,460, filed on Jun. 8, 2007, and entitled MANAGEMENT OF USER INTERFACE ELEMENTS, which claims priority under 35 U.S.C. §119(e) to U.S. Provisional Patent Application No. 60/879,003, filed on Jan. 5, 2007, and entitled USER INTERFACE FUNCTIONS FOR MEDIA CONTENT ACCESS SYSTEMS AND METHODS, the contents of which are hereby incorporated by reference in their entirety.

BACKGROUND INFORMATION

Elements such as images and other items in a software application delivered through a content processing device such as a set top box (STB) may be common to, or at least similar in, many screens displayed in the application. For example, a particular menu, perhaps with some variations, may be displayed in many screens in an application. Nonetheless, a developer writing such an application generally must repeat the deployment of elements such as images and the like for various screens, even when the various screens include identical images, etc. Further, if an element is updated or changed references to the element for each of the screens in which it appears must also be updated or changed.

Moreover, an application that must repeatedly retrieve large amounts of the same data is inefficient, providing poor user response times, among other problems. Some content processing devices have minimal memory resources, and therefore have problems supporting applications with numerous data elements.

DETAILED DESCRIPTION OF THE PREFERRED EMBODIMENTS

Figure 1:
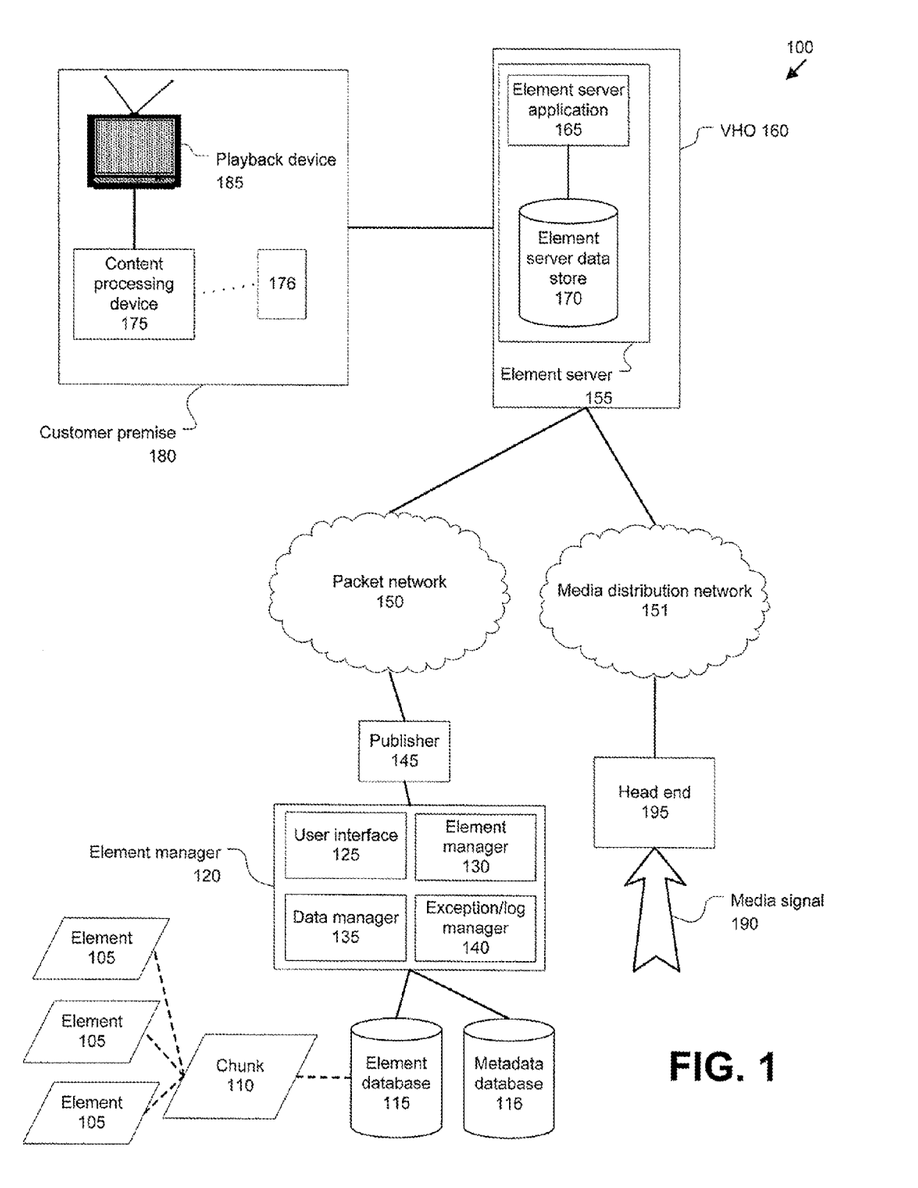
FIG. 1 illustrates an exemplary system including an element manager for managing presentation elements and chunks that include presentation elements.

FIG. 1 illustrates an exemplary system 100 for managing presentation elements 105, which may be organized or grouped in chunks 110. Presentation elements 105 generally consist of graphical images, and therefore may consist of portable network graphics (PNG), graphical interchange format (GIF), joint photographic experts group (JPEG) files, etc. However, in certain embodiments elements 105 may include other formats, such as audio files, video files, etc.

Elements 105 are generally stored in an element database 115. Element database 115 is a file system associated with a computer running an operating system such as the Microsoft Windows® operating system. A metadata database 116 may be used to store metadata concerning elements 105, such as descriptions, identifiers, and locations of the elements 105 in the element database 115, e.g., locations in a Windows file system. Metadata database 116 may be a relational database, such as is known. Advantageously, storing hash values and/or other identifiers for elements 105 in metadata database 116, as is described further below, allows for locations of files including elements 105 to be quickly and efficiently determined, thereby allowing for quick and efficient retrieval of files including elements 105. Further, storing hash values advantageously helps prevent duplication of elements 105 in element database 115, e.g., it may easily be determined for a developer wishing to add an element 105 to database 115 whether the element 105, or a copy thereof, is already present in the database 115.

Chunks 110 are logical groupings of elements 105. A chunk 110 generally includes multiple elements 105, although a chunk 110 may include just one element 105. Further, an element 105 may be included in more than one chunk 110. Information concerning chunks 110, i.e., associations of elements 105 with a chunk 110, may be stored in metadata database 116.

An element management subsystem 120 generally includes a set of computer-executable instructions running on a general purpose computer (not shown in FIG. 1), or possibly on multiple computing devices in selective communication with one another. Element management subsystem 120 may be organized into various modules, including a user interface 125, an element manager 130, a data manager 135, and an exception manager 140. Also, although not shown in FIG. 1, element management subsystem 120 generally includes a security module to restrict user access to element management subsystem 120 using generally known mechanisms for application security, and also to protect the transmission of information sent and/or received by element management subsystem 120. Further, databases 115 and 116 may be included within a computer that runs element management subsystem 120, or one or both of databases 115 and 116 may be included within other computing devices.

A publisher module 145 may be included within element management subsystem 120 or may be a separate module as illustrated in FIG. 1, and further may be included on a computing device within element 120 or may be included within a separate computing device. In any event, publisher 145 is used to publish elements 105, generally although not necessarily in chunks 110, through packet-switched network 150 to element server 155 in video hub office (VHO) 160.

Figure 2:
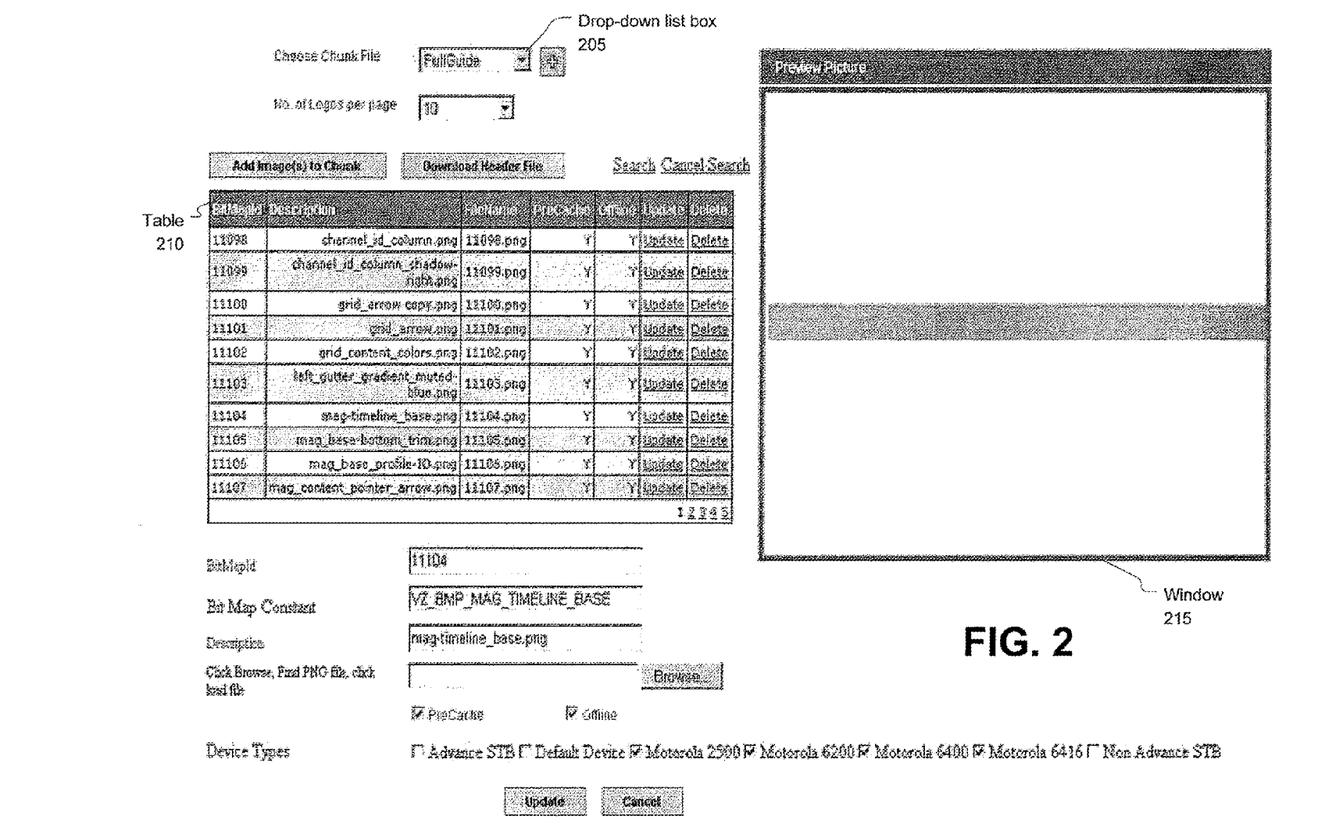
FIG. 2 illustrates a portion of a screen shot from an exemplary screen presented by a user interface in an element management subsystem.

User interface 125 provides a mechanism for a user of element management subsystem 120, e.g., a system administrator or the like, to access element management subsystem 120. For example, user interface 125 may include a graphical user interface (GUI) such as a set of web pages to be rendered in a conventional web browser. A portion of an exemplary screen from user interface 125 is shown in FIG. 2, discussed further below. In an embodiment, a user may access user interface 125 through a web browser included on a computer that also includes element management subsystem 120, or may access user interface 125 through a local area network (LAN), packet-switched network 150, or some other network. By accessing user interface 125, a user may perform various operations to manage and organize elements 105, such as storing elements 105 in element database 115, creating chunks 110, editing chunks 110, causing elements to be published to element server 155, etc. Operations that may be performed in at least in part through user interface 125 are described in more detail below.

Element manager 130 includes instructions for receiving inputs from, and providing outputs to, user interface 125. Further, element manager 130 includes instructions for communicating with data manager 135 to retrieve and store chunks 110 and/or elements 105.

Data manager 135 includes instructions for communicating with databases 115 and 116. For example, upon receiving a request or instruction to publish a chunk 110, data manager 135 may query metadata database 116 according to an identifier for the chunk 110 to determine locations in element database 115 where elements 105 belonging to the chunk 110 may be located. Further, data manager 135 may query element database 115 to obtain such elements 105, and to return such elements 105 to element manager 130. Other examples of using data manager 135 to store, retrieve, and organize elements 105 are discussed further below.

Exception and log manager 140 includes instructions for capturing and handling exceptions generated by other modules within element management subsystem 120. Such exceptions may include a variety of conditions, including, for example, an inability to locate a requested chunk 110 or an element 105 within a chunk 110, an inability to access one of databases 115 or 116, etc. Also, manager 140 generally includes instructions for logging such exceptions, e.g., by writing to a file stored in the computer, or in an associated memory of the computer, that includes element management subsystem 120.

As mentioned above, publisher 145 is a module that may be included within exception manager 140 although, as shown in FIG. 1, publisher 145 may be a separate module. Publisher 145 provides chunks 110 to element server 155, generally using known mechanisms for publishing information from a server to a client. For example, publisher 145 may be a web service such as is known using protocols and standards such as simple object access protocol (SOAP), web service description language (WSDL), etc.

Packet switched network 150 is generally an internet protocol (IP) network. As such, network 150 generally uses one or more known protocols for transporting data, such as user datagram protocol (UDP), transport control protocol (TCP), hypertext transfer protocol (HTTP), etc. Further, network 150 may include a variety of networks such as a wide area network (WAN), e.g., the Internet, a local area network (LAN), etc. As is known, packet switched network 150 may be used to transport a variety of data, including multimedia data such as audio data and video data.

Video hub office 160, which includes element server 155 as mentioned above, is known for serving as a point of aggregation for media content. For example, a media signal 190, e.g., a video signal encoded as a Motion Picture Experts Group-2 (MPEG 2) stream, may be provided from a head end 195 through a media distribution network 151 to video hub office 160. Because packet-switched network 150 may be used to transport multimedia data, it is to be understood that embodiments are possible in which networks 150 and 151 are in fact combined into a single network, or in which media distribution network 160 is simply omitted, wherein packet switched network 150 is used to provide media signal 190 to video hub office 160.

Element server 155 is generally a computing device that includes an element server application 165. Further, an element server data store 170 may be included within element server 155, or may be attached to or otherwise in the communication with element server application 165.

Element server application 165 generally includes instructions for receiving chunks 110 from publisher 145, and further for providing chunks 110 and/or individual elements 105 to a content processing device 175, e.g., a located within a customer premise 180. Upon receiving chunks 110 from publisher 145, element server application 165 generally stores such chunks in element server data store 170. Further, upon receiving a request for a chunk 110 or element or elements 105 from content processing device 175, element server application 165 generally includes instructions for retrieving such chunk 110 or element or elements 105 from element server data store 170 and providing the chunk 110 or elements 105 to content processing device 175. While elements 105 are generally organized into chunks 110 for convenience and so that multiple elements 110 can efficiently be combined into a single bitstream transmitted to content processing device 175, it is to be understood that elements 105 may be published, transmitted to content processing device 175, etc. without being organized or logically grouped into chunks 110.

Content processing device 175 may be a set top box (STB) or similar device known for receiving a media signal from a network and for providing media programming, e.g., audio, video, etc., to a media playback device 185. Content processing device 175 may be controlled by a user through a control 176, thereby facilitating the selection and playing of content through media playback device 185. But one example, from many possible examples, of content processing device 175 is set top box model DCT6416 made by Motorola, Inc. of Schaumburg, Ill.

Control 176 is generally a remote control known for selectively communicating with content processing device 175 through wireless communications, such as infrared (IR) communications. Control 176 generally includes numeric keys for selecting channels of video programming, as well as other keys for making selections and requests according to menus displayed on playback device 185, in addition to arrow keys and the like for selecting channels and items in a menu, changing volume levels, etc.

Media playback device 185 may include a variety of known equipment alone or in combination, such as a video receiver, including a conventional television or a hi-definition television (HDTV), audio equipment including an amplifier and speakers, or devices that incorporate the capability to simultaneously process both video and audio data, etc. Media playback device 185 may be connected to, and receive multimedia content from, content processing device 175 in a known manner.

Media distribution network 151 may include hardware and software for providing media signal 190 via coaxial cable and/or fiber optic cable. In the illustrated embodiment, fiber optic cable is used to provide both data and media signal 190 to customer premise 180, including to content processing device 175. As is known, an optical line terminal (OLT) may serve as a terminus for an optical network or an optical line. An OLT may accordingly provide data, including video signal 190, to one or more optical network terminals (ONTs). An ONT is generally situated adjacent to a customer premise 180, for the purpose of providing data received over an optical line to the customer premise network 180, including content processing device 175. Accordingly, FIG. 1 illustrates a hybrid network system in which media signal 190, transported over media distribution network 151, and also data transported over packet switched network 150, are received in customer premise 180 through a fiber optic line. However, it should be understood that embodiments are possible in which content processing device 175 receives both data and audio/video communications via media other than fiber optic cables to customer premise 180.

Computing devices such as content processing device 110, element server 155, and computers including element management subsystem 120, element database 115, metadata database 116, etc. may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Content processing device 175 generally is a specialized device for receiving video signals 190 from head end 195 via network 151, as discussed above, and may be provided with a proprietary or specialized operating system other than those enumerated above. For example, in one embodiment, content processing device 175 is an STB provided with a real time operating system (RTOS) such as is known. However, it is to be understood that content processing device 175 may be a computing device such as one of those enumerated above, so long as the computing device is capable of receiving media signals 190 from network 151, and also is capable of providing presentation elements 105 for display on the media playback device 185, and sending and receiving communications to and from element server 155, as described herein. Although not reflected in FIG. 1, content processing device 175 and element server 155 may communicate through packet switched network 150. However, content processing device 175 and element server 155 may also conduct packet communications through one or more routers or other switching devices (also not shown in FIG. 1) connected by fiber optic cable, coaxial cable, wires, etc.

Computing devices generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Databases or data stores described herein may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

FIG. 2 illustrates a portion of a screen shot from an exemplary screen presented by user interface 125. A drop-down list box 205 allows a user to select a chunk 110 from a list of chunks 110 to edit. A table 210 lists elements 105 included in a selected chunk 110. Further, it can be seen that the user is provided with a preview of an element 105 in a window 215, along with other information for loading elements 105 and editing chunks 110.

Figure 3:
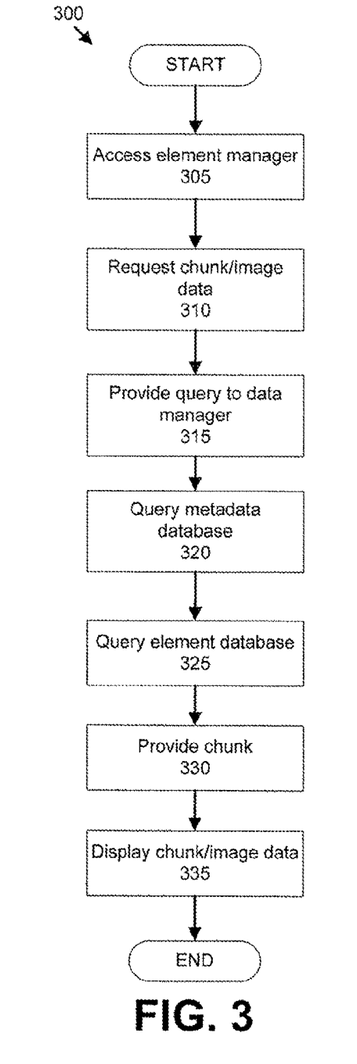
FIG. 3 illustrates an exemplary process for displaying information concerning a chunk in a user interface of the element manager shown in FIG. 1.

FIG. 3 illustrates an exemplary process 300 for displaying information concerning a chunk 110 in user interface 125 of element management subsystem 120.

In step 305, a user accesses element management subsystem 120, generally by accessing user interface 125 through a standard web browser. If element management subsystem 120 is not already available, such access may cause modules 125, 130, 135, and/or 140 of element management subsystem 120 to be instantiated and loaded into a memory of a computer that includes element management subsystem 120. It should be understood that user access of element management subsystem 120 generally includes authentication and identification of a user, e.g., using a security module such as that mentioned above.

Next, in step 310, a user requests to see information relating to a chunk 110. For example, a user authenticated and identified in step 305 above may be presented with a list of chunks 110 that the user may access, and may then select from such list, or may otherwise provide as input information identifying a chunk 110 to be accessed. Such access may be limited to simply viewing certain chunks 110, while certain other chunks 110 may be available for the user to edit or even delete. Further, certain or all users may have rights to create new chunks 110, e.g., according to the process 600 described below with respect to FIG. 6.

Next, in step 315, element manager 130 receives the user request provided in step 310, and provides a query for the requested chunk 110 to data manager 135. Such query generally includes an identifier, preferably a unique identifier, for the requested chunk 110.

Next, in step 320, data manager 135 queries metadata database 116 for information concerning the chunk 110 requested in step 310. For example, data manager 135 may provide an identifier for the chunk 110 to metadata database 116. Metadata database 116 may then provide to data manager 135 information concerning the location of elements 105 included in the chunk 110 in element database 105. For example, in one embodiment, metadata database 116 stores the locations of files that include elements 105, and provides such locations to data manager 135 in step 320. Further, metadata database 116 may also provide to data manager 135 information concerning elements 105 such as file types, descriptions, etc. Such information may be used in the display of a chunk 110 in interface 125, e.g., as described below with respect step 335.

Next, in step 325, data manager 135 queries element database 115 for the file or files including elements 105, the locations of such files having been identified as described above with respect to step 320.

Next, in step 330, data manager 135 receives and returns to element manager 130 files for elements 105 included in the requested chunk 110, which in turn accordingly provides the requested chunk 110 to user interface 125.

Next, in step 335, the requested chunk 110 is displayed in user interface 125. Such chunk 110 may be displayed in user interface 125 in a variety of ways. For example, a chunk 110 may be displayed as a thumbnail or perhaps larger image showing all of the elements 105 included in the chunk 110 together as they would appear on playback device 185. Further, information concerning the chunk 110 from metadata database 116 may be included in user interface 125, e.g., a description of elements 105 in the chunk 110, file types of elements 105 in the chunk 110, content processing devices 175 and/or playback devices 185 with which the chunk 110 is compatible or for which it is intended, etc.

Following step 335, process 300 ends.

Figure 4:
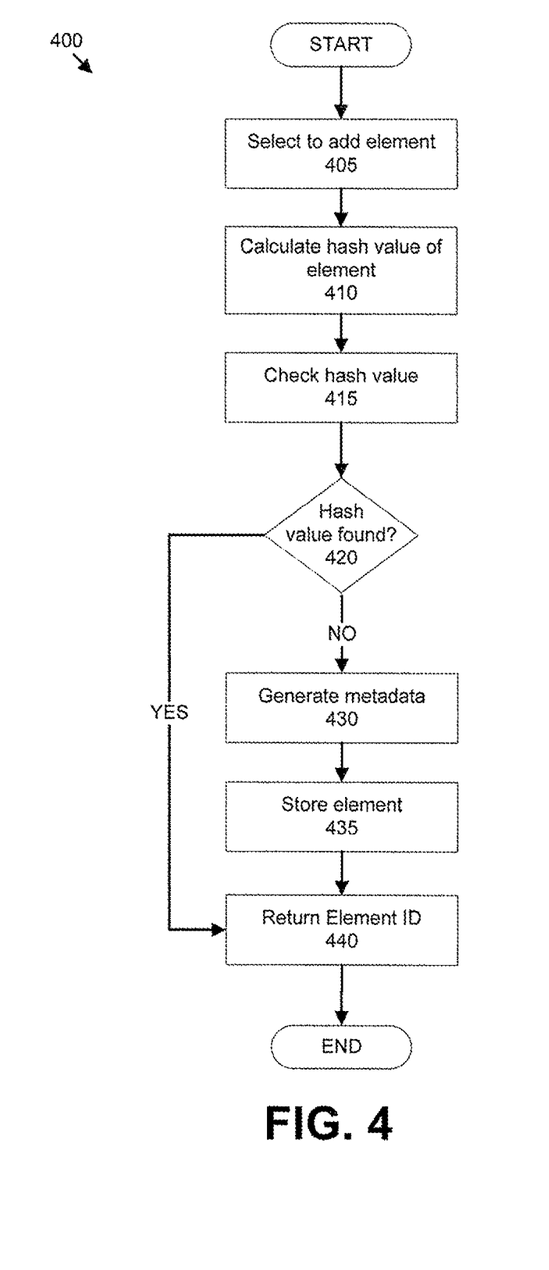
FIG. 4 illustrates an exemplary process for adding an element to an element database.

FIG. 4 illustrates an exemplary process 400 for adding an element 105 to element database 115.

In step 405, a user of user interface 125 selects to add an element 105 to element database 115. User interface 125 generally provides a mechanism for a user to upload to element management subsystem 120 elements 105 to be included in a new chunk 110. For example, a user may identify files that include elements 105, and such files may be uploaded to element management subsystem 120 using known protocols such as hypertext transfer protocol (HTTP). Further, a user may provide information for metadata database 116, such as descriptions of new elements 105 to be included in element database 115.

Next, in step 410, element manager 130 calculates a hash value for the element 105 indicated in step 405. Various ways of calculating a hash value for a file are known. For example, an embodiment uses the known Message-Digest 5 (MD5) heuristic designed by Professor Ronald Rivest of the Massachusetts Institute of Technology to calculate a hash value for an element 105.

Next, in step 415, element manager 130 provides the hash value calculated in step 410 to data manager 135 to determine whether the hash value calculated in step 410 matches any hash values stored in metadata database 116. That is, the purpose of step 415 is to determine whether the element indicated in step 405 already is present in element database 115, the odds of a matching hash value for non-identical elements 105 being extremely low.

Next, in step 420, if data manager 135 determines that the hash value calculated in step 410 already is present in metadata database 116 then step 440 is executed next. Otherwise, step 430 is executed next.

In step 430, data manager 135 generates metadata for the element 105 indicated in step 405. Such metadata includes the hash value calculated in step 410, as well as information concerning a location in element database 115 where the element 105 will be stored. Metadata for element 105 may also include information such as a description of the element, e.g., such as may be provided to user interface 125, a type of file in which the element 105 is stored, types of devices with which the element 105 is compatible or for which it is intended, etc.

Next, in step 435, the element 105 indicated in step 405 is stored in element database 115, and further, the metadata generated in step 430 is stored in metadata database 116.

In step 440, which may follow either step 420 or step 435, data manager 135 returns the hash value calculated in step 410 to element manager 130, which may then include such hash value in a list of available elements 105 to be displayed in user interface 125.

Following step 440, process 400 ends.

Figure 5:
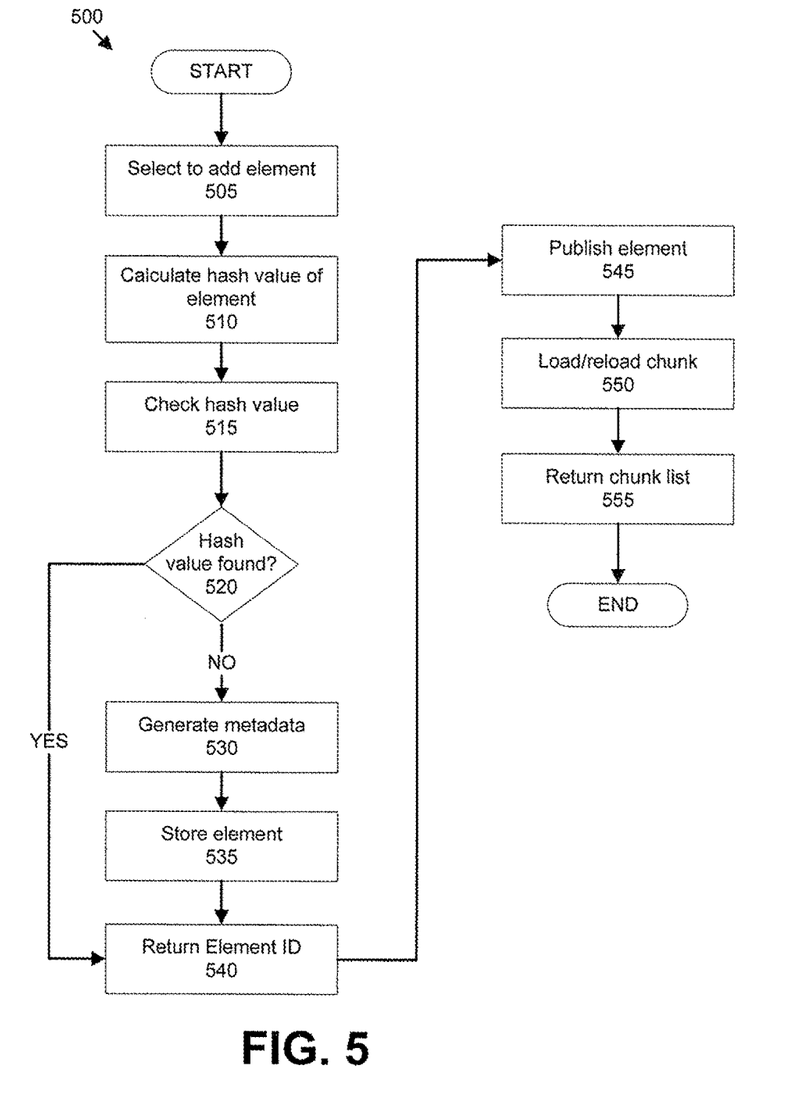
FIG. 5 illustrates an exemplary process for adding an element to a chunk.

FIG. 5 illustrates an exemplary process 500 for adding an element 105 to a chunk 110.

In step 505, element manager 130 receives an indication that an element 105 is to be added to a specified chunk 110, e.g., according to input received via a user interface 125. It is to be understood that the specified chunk 110 may be a newly created chunk 110. An exemplary process for creating a chunk 110 is described below with respect to FIG. 6.

An element 105 added to a chunk 110 may be selected from elements 105 already stored in element database 115. For example, user interface 125 may provide a mechanism for browsing and selecting from elements 105 stored in element database 115. Alternatively, user interface 125 may upload the new element 105 to element manager 130 for addition to element database 115, e.g., as described above with reference to FIG. 4.

Step 510 follows step 505. Steps 510 through step 535 are executed in a fashion similar to that described above with respect to steps 410 through step 435.

In step 540, which may follow either step 520 or step 535, data manager 135 returns the hash value calculated in step 510 to element manager 130, which may then include such hash value in the chunk 110 specified as described above with respect to step 505.

Following step 540, in step 545, element manager 130 provides the hash value calculated in step 510 to publisher 145 so that the element 105 identified in step 505 may be published to element server 155.

Next, in step 550, the chunk 110 specified as described above with respect to step 505 is loaded or reloaded in a memory associated with element management subsystem 120. The purpose of placing the chunk 110 in the memory is to be able to provide the chunk 110, or some representation or description of the chunk 110, to user interface 125.

Next, in step 555, element manager 130 provides a list of the elements 105 included in the chunk 110 loaded into a memory in step 552 user interface 125, possibly also with a representation, e.g., a set of images, of the chunk 110, and possibly also with other data such as a description of elements 105 in the chunk 110, etc.

Following step 555, process 500 ends.

Figure 6:
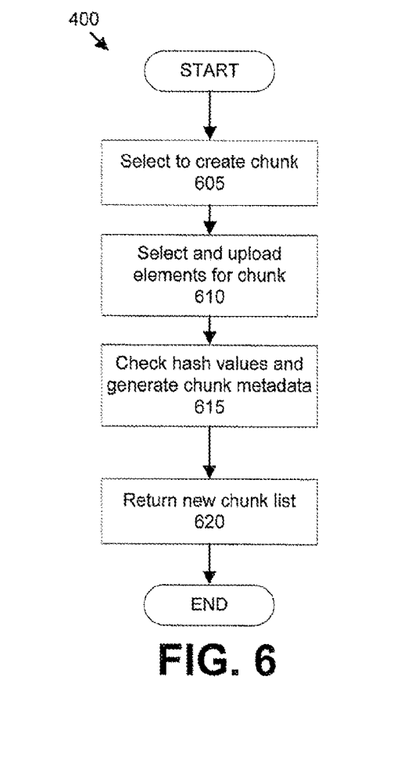
FIG. 6 illustrates an exemplary process for creating a chunk.

FIG. 6 illustrates an exemplary process 600 for creating a chunk 110.

In step 605, a user makes a selection in user interface 125 to create a new chunk 110.

Next, in step 610, in response to the user selection of step 605, user interface 125 provides a mechanism for a user to upload to element management subsystem 120 elements 105 to be included in a new chunk 110, e.g., as is described above with reference to step 505 in process 500.

Next, in step 615, upon receiving elements 105 for a new chunk 110, for each such element 105 element manager 130 calculates hash values, generates metadata, and stores the element or elements 105 in a manner similar to that described above with respect to steps 510 through 335 of process 500.

Next, in step 620, element manager 130 returns a list of elements 105 included in the new chunk 112 user interface 125 possibly also with a representation, e.g., a set of images, of the chunk 110, and possibly also with other data such as a description of elements 105 in the chunk 110, etc.

Following step 620, process 600 ends.

Figure 7:
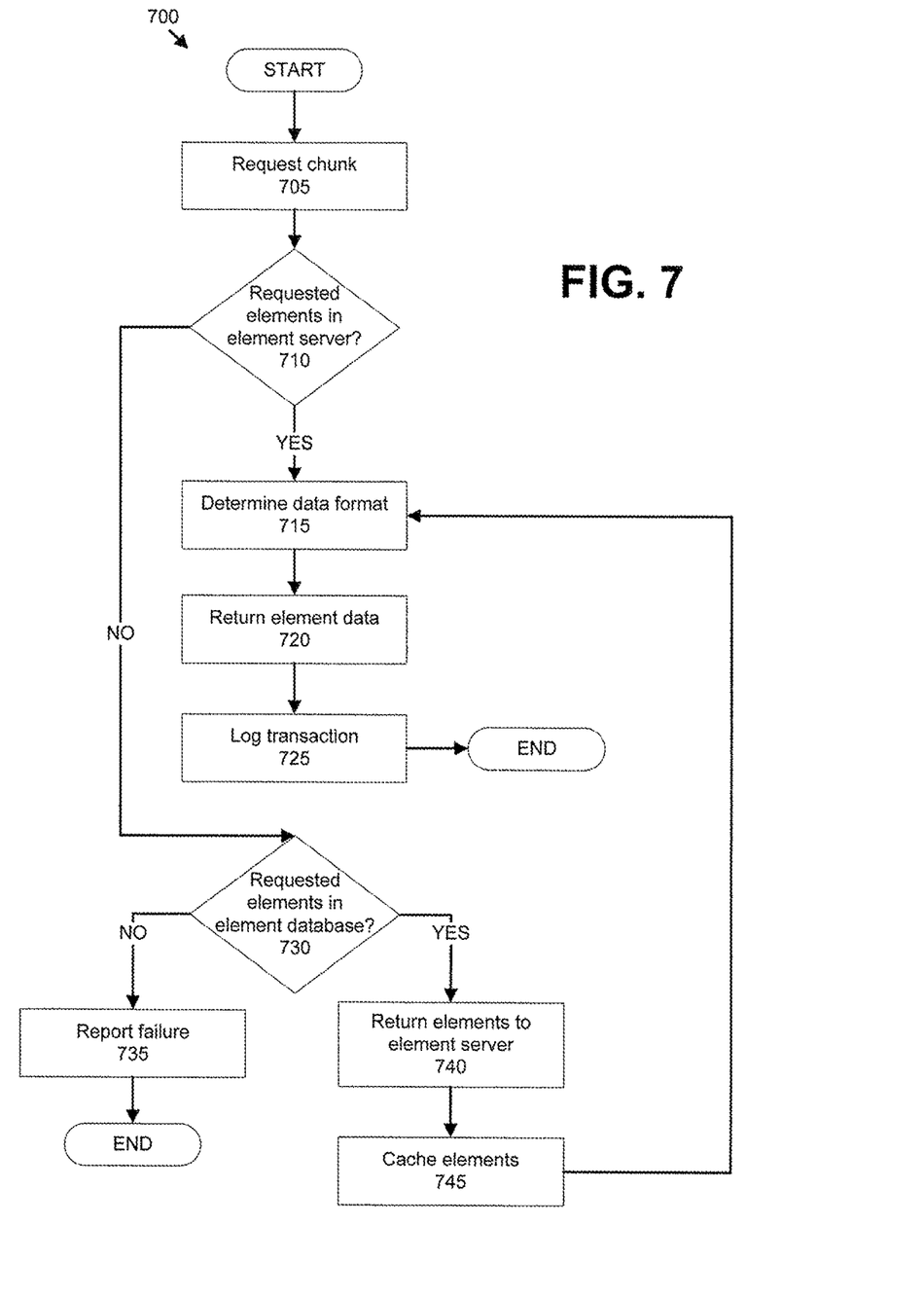
FIG. 7 illustrates an exemplary process in which a content processing device requests and receives a chunk from element server.

FIG. 7 illustrates an exemplary process 700 in which content processing device 175 requests and receives a chunk 110 from elements server 155.

In step 705, content processing device 175 sends a request to element server 155 for a chunk or chunks 110, or for one or more elements 105 that may be in different chunks 110. For example, a user using control 176 may select a particular screen or menu to be displayed in media playback device 185 through content processing device 175. Program instructions included within content processing device 175 may therefore transmit to element server 155 one or more unique identifiers or other indicators of presentation elements 105 or a chunk or chunks 110, required for a display in media playback device 185.

By way of example, in one embodiment content processing device 175 sends a request to element server 155 as follows:

```
public byte[ ] GetBitMaps(string BitMapIds, bool
    isBigEndian, string STBID, string transactionId).
```

It may be recognized that the foregoing request is a function call written according to the C++ programming language. The request expects that a stream of binary data will be returned. However, embodiments are possible in which data in other formats, e.g., according to eXtensible Markup Language (XML) or some other format, are returned. Parameters to the request include a string of identifiers for elements 105 in a chunk or chunks 110 (BitMapIds), an indicator concerning whether data should be returned in big endian or little endian format (isBigEndian), an identifier for content processing device 175 (STBID), and a unique identifier for the request (transactionId). The first two parameters are used to identify requested elements 105 and an appropriate format for returning such elements 105, while the latter two parameters are generally used for logging a record of the request including any errors.

Next, in step 710, element server application 165 determines whether the requested elements 105 or chunk or chunks 110 are present in element server data store 170. Element server data store 170 receives and stores chunks 110 published by publisher 145. Further, element server data store 170 may act as a cache to store elements 105 and/or chunks 110 that have previously, within a predetermined period of time, e.g., two weeks, been requested by a content processing device 175. If the requested elements 105 or the requested chunk or chunks 110 are present in element server data store 170, then step 715 is executed next. If not, then step 730 is executed next.

In step 715, element server application 165 determines an appropriate format for returning requested elements 105 to content processing device 175. For example, assuming that content processing device 175 is a set top box, certain STBs process data in big endian format, while other STBs process data in little endian format. Accordingly, when requesting a chunk or chunks 110 as described above in step 705, consistent with the exemplary function call described above, content processing device 175 generally includes an identifier for itself, generally a unique identifier, and also information generally sufficient to inform element server application 165 of the format in which elements 105 should be provided to the content processing device 175.

Next, in step 720, element server application 165 retrieves from element server data store 170, and returns to content processing device 175 in an appropriate format, e.g., as determined in step 715, the elements 105 or chunk or chunks 110 requested in step 705, i.e., one or more presentation elements 105.

By way of example, in one embodiment, the following C++ structures are serialized to binary format and returned to content processing device 175:

```
public struct STBBitmapStruct
{
    public STBReturnCode retStatusObj; // see below
    public short nNoOfFilesFound; //Number of Files Found
    public short nNoOfFilesNotFound; //Number of Files
// Not Found
    public short sFailedBitmapsLength; //Length of the
// string of the concatenated Bitmaps that failed
    public string strFailedBitmaps; //String having the
// failed Bitmaps' identifiers separated by |
    public STBResourceDataObject [ ] m_BitmapDataArray;
// Array of Bitmap Data
}
public struct STBResourceDataObject
{
    public int       fileID;      //BitmapId
    public int       fileSize;    //Size of the file
    public int       fileWidth;   //Width of the File
    public int       fileHeight;  //Height of the File
    public byte[ ]   bitmapData;  //Actual Bitmap Data
}
public class STBReturnCode
{
    public int sReturnCode;                //Success or Failure
    [Serialize(StringSize=18)]
    public string strReturnMessage; //Message
}
```

As can be seen, each element 105 is included in a "STBResourceDataObject" and a chunk 110 is represented in the array of such objects included in a "STBBitmapStruct." Further, information concerning elements 105 that could not be located is provided to content processing device 175 for rendering a user interface.

Next, in step 725, element server application 165 records in a log details concerning the provision of one or more elements 105 or one or more chunks 110 to the content processing device 175 as described above.

Following step 625, process 700 ends.

In step 730, which may follow step 710 as described above, element server application 165 sends a request to element manager 130 for elements 105 in the chunk or chunks 110 requested in step 705 above. In conjunction with data manager 135, element manager 130 determines whether the requested elements are in element database 115. If they are not, step 735 is executed next. However, if the requested elements 105 are present in element database 115, step 740 is executed next.

In step 735, element manager 130 reports to element server application 165 that the requested elements 105 were not located in element database 115. At the same time, exception manager 140 may note in a log or the like that requested elements 105 were not found. Further, element server application 165 generally includes program instructions for reporting to content processing device 175 circumstances in which requested elements 105 were not found.

Following step 735, process 700 ends.

In step 740, which may follow step 730 as described above, element manager 130 obtains and returns to element server application 165 the requested one or more elements 105 and/or chunks 110. At the same time, exception and log manager 140 may note in a log or the like that requested elements 105 were returned to element server application 165.

Next, in step 745, element server application 165 causes the elements 105 received as described above with respect to step 740 to be cached in element server data store 170.

Step 715, described above, is executed following step 745.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising:
   an element server in a video hub office that includes at least one device configured to provide a media signal to a content processing device located at a customer premises; and
   at least one computing device that includes at least one processor and that is located remote from the video hub office and the customer premises, the at least one computing device comprising:
      a first data store that includes a first set of data that includes a plurality of presentation elements, the plurality of presentation elements comprising a plurality of graphical images,
      a second data store that includes a second set of data that includes information concerning one or more associations of one or more presentation elements included in the plurality of presentation elements in the first set of data with a chunk that is a logical grouping of the one or more presentation elements, and
      an element management subsystem that provides the one or more presentation elements associated with the chunk to the element server in the video hub office, the element server configured to cache the one or more presentation elements for use by the element server in fulfilling a request from the content processing device;
   wherein the at least one computing device remote from the video hub office and the customer premises provides a user interface remote from the video hub office and the customer premises, the user interface presenting a screen displaying information about the one or more presentation elements associated with the chunk and an image of the chunk showing the one or more presentation elements associated with the chunk in the user interface as the one or more presentation elements associated with the chunk would appear when displayed at the customer premises.

2. The system of claim 1, wherein the second set of data further includes metadata concerning the presentation elements, the metadata including a hash value related to each of the presentation elements and a location of each of the presentation elements in the first data store.

3. The system of claim 1, wherein the at least one computing device remote from the video hub office and the customer premises is further configured to receive input from the user interface to add a new element to the first set of data.

4. The system of claim 3, wherein the at least one computing device remote from the video hub office and the customer premises is further configured to calculate a hash value of the new element, and to check the hash value of the new element against the second set of data to determine whether the new element was previously added to the first set of data.

5. The system of claim 1, wherein the information about the one or more presentation elements associated with the chunk indicates one or more types of content processing devices with which the one or more presentation elements associated with the chunk are compatible.

6. The system of claim 1, wherein the information about the one or more presentation elements associated with the chunk indicates one or more types of content processing devices for which the one or more presentation elements associated with the chunk are intended.

7. The system of claim 1, wherein the information about the one or more presentation elements associated with the chunk indicates one or more types of files in which the one or more presentation elements associated with the chunk are stored.

8. The system of claim 1, wherein the user interface provides a mechanism for a user of the element management subsystem to cause the element management subsystem to provide the one or more presentation elements associated with the chunk to the element server in the video hub office.

9. The system of claim 1, wherein the user interface provides a mechanism for a user of the element management subsystem to edit the one or more presentation elements associated with the chunk.

10. The system of claim 1, wherein the one or more graphical images are stored in one or more portable network graphics (PNG) files, one or more graphical interchange format (GIF) files, or one or more joint photographic experts group (JPEG) files.

11. The system of claim 1, wherein the element server is configured to serialize and transmit the cached one or more of the presentation elements associated with the chunk in a binary stream in response to the request from the content processing device, the one or more of the presentation elements associated with the chunk being formatted according to a parameter of the request.

12. The system of claim 11, wherein the parameter specifies for the one or more presentation elements associated with the chunk to be provided according to one of a big endian format and a little endian format.

13. A system comprising:
an element server in a video hub office that includes at least one device configured to provide a media signal to a content processing device located at a customer premises; and
at least one computing device that includes at least one processor and that is located remote from the video hub office and the customer premises, the at least one computing device comprising:
a first data store that includes a first set of data that includes a plurality of presentation elements,
a second data store that includes a second set of data that includes information concerning one or more associations of one or more presentation elements included in the plurality of presentation elements in the first set of data with a chunk that is a logical grouping of the one or more presentation elements, and
an element management subsystem that provides the one or more presentation elements associated with the chunk to the element server in the video hub office, the element server configured to cache the one or more presentation elements for use by the element server in fulfilling a request from the content processing device;
wherein the at least one computing device remote from the video hub office and the customer premises provides a user interface remote from the video hub office and the customer premises for use by a user to access the element management subsystem and to edit the one or more presentation elements associated with the chunk; and
wherein the at least one computing device presents, within the user interface, a screen displaying information about the one or more presentation elements associated with the chunk and an image of the chunk showing the one or more presentation elements associated with the chunk in the user interface as the one or more presentation elements associated with the chunk would appear when displayed at the customer premises.

14. The system of claim 13, wherein the user interface provides a mechanism for use by the user to cause one or more of the plurality of presentation elements to be published to the element server.

15. The system of claim 13, wherein the user is an administrator of the element management subsystem.

16. A method comprising:
providing, by at least one device in a video hub office, a media signal to a content processing device located at a customer premises;
storing, by at least one computing device remote from the video hub office and the customer premises, a first set of data that includes a plurality of presentation elements, the plurality of presentation elements comprising a plurality of graphical images;
storing, by the at least one computing device remote from the video hub office and the customer premises, a second set of data that includes information concerning one or more associations of one or more presentation elements included in the plurality of presentation elements in the first set of data with a chunk that is a logical grouping of the one or more presentation elements;
providing, by the at least one computing device remote from the video hub office and the customer premises, the one or more presentation elements associated with the chunk to an element server in the video hub office, the element server configured to cache the one or more presentation elements for use by the element server in fulfilling a request from the content processing device; and
providing, by the at least one computing device remote from the video hub office and the customer premises, a user interface remote from the video hub office and the customer premises, the user interface presenting a screen displaying information about the one or more presentation elements associated with the chunk and an image of the chunk showing the one or more presentation elements associated with the chunk in the user interface as the one or more presentation elements associated with the chunk would appear when displayed at the customer premises.

17. The method of claim 16, wherein the second set of data further includes a hash value related to each of the presentation elements and a location of each of the presentation elements in the first set of data.

18. The method of claim 17, further comprising:
receiving, by the at least one computing device remote from the video hub office and the customer premises, input from the user interface to add a new element to the first set of data;
calculating, by the at least one computing device remote from the video hub office and the customer premises, a hash value of the new element; and
checking, by the at least one computing device remote from the video hub office and the customer premises, the hash value of the new element against the second set of data to determine whether the new element was previously added to the first set of data.

19. The method of claim 17, further comprising:
receiving, by the at least one computing device remote from the video hub office and the customer premises, input from the user interface selecting the chunk from a list of chunks;
querying, by the at least one computing device remote from the video hub office and the customer premises, the second set of data for information concerning the chunk;
receiving, by the at least one computing device remote from the video hub office and the customer premises in response to the querying, the information about the one or more presentation elements associated with the chunk; and
displaying, by the at least one computing device remote from the video hub office and the customer premises, the information about the one or more presentation elements associated with the chunk in the user interface.

20. The method of claim 19, further comprising:
receiving, by the at least one computing device remote from the video hub office and the customer premises in response to the querying of the second set of data, information concerning one or more locations of the one or more presentation elements associated with the chunk in the first set of data;
using, by the at least one computing device remote from the video hub office and the customer premises, the one or more locations of the one or more presentation elements associated with the chunk to query the first set of data for the one or more presentation elements associated with the chunk;

receiving, by the at least one computing device remote from the video hub office and the customer premises in response to the querying of the first set of data, the one or more presentation elements associated with the chunk; and displaying, by the at least one computing device remote from the video hub office and the customer premises, the image of the chunk showing the one or more presentation elements associated with the chunk in the user interface as the one or more presentation elements associated with the chunk would appear when displayed at the customer premises.

21. The method of claim 16, further comprising:

receiving, by the at least one computing device remote from the video hub office and the customer premises, input from the user interface to add a new element to the first set of data;

storing, by the at least one computing device remote from the video hub office and the customer premises, the new element in the first set of data;

storing, by the at least one computing device remote from the video hub office and the customer premises, information about the new element in the second set of data;

receiving, by the at least one computing device remote from the video hub office and the customer premises, input from the user interface to add the new element to the chunk; and storing, by the at least one computing device remote from the video hub office and the customer premises, information concerning an association of the new element with the chunk in the second set of data.

* * * * *